United States Patent Office 2,783,242
Patented Feb. 26, 1957

2,783,242

5-ACYLIMINO-4-SUBSTITUTED-2-BENZYL MERCAPTO-$\Delta^2$-1,3,4-THIADIAZOLINES AND METHODS FOR THEIR PREPARATION Richard William Young, Riverside, and Kathryn Helen Wood, Old Greenwich, Conn., assignors to American Cyanamid Company, New York, N. Y., a corporation of Maine No Drawing. Application March 4, 1955,
Serial No. 492,298

15 Claims. (Cl. 260—306.8)

This invention relates to a new series of organic compounds. More particularly, this invention is concerned with certain 5-acylimino-4-substituted-2-benzylmercapto-$\Delta^2$-1,3,4-thiadiazolines and methods for their preparation.

In the copending U. S. application S. N. 492,297 of Richard W. Young, Kathryn H. Wood and James R. Vaughan, filed concurrently herewith, there is disclosed a series of 5-acylimino-4-substituted-$\Delta^2$-1,3,4-thiadiazoline-2-sulfonamides which are useful as diuretic agents. In addition, these compounds are capable of penetrating into the cerebrospinal fluid and, for this reason, they find particular application in the treatment of epilepsy. The compounds are prepared by suspending a 5-acylimino-4-substituted-2-benzylmercapto-1,3,4-thiadiazoline in an aqueous acid solution and then passing chlorine through the mixture. The resulting sulfonyl chloride derivative is then converted to the corresponding sulfonamide upon treatment with ammonia. To illustrate the preparation of these compounds with a specific example, 5-acetylimino-4-methyl-2-benzylmercapto-$\Delta^2$-1,3,4-thiadiazoline is suspended in 33% acetic acid and the mixture is chlorinated. The sulfonyl chloride derivative is then separated, contacted with liquid ammonia and the resulting 5-acetylimino-4-methyl-$\Delta^2$-1,3,4-thiadiazoline - 2 - sulfonamide is crystallized from hot water. The preparation of analogous compounds is described in full detail in the above mentioned Young, et al. application.

We have discovered a series of compounds which, as illustrated by the preceding paragraph, are useful as intermediates in the preparation of therapeutically active 5-acylimino-4-substituted-$\Delta^2$-1,3,4 - thiadiazoline-2-sulfonamides. These compounds may be represented by the following general formula:

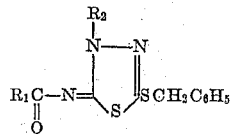

wherein $R_1$ is a hydrogen atom, a lower alkyl or a monocyclic aralkyl substituent and $R_2$ is a lower alkyl or a monocyclic aralkyl substituent. As examples of suitable alkyl groups may be given those containing from 1 to 6 carbon atoms—namely, methyl, ethyl, propyl, isopropyl, butyl, isobutyl, pentyl and hexyl. Suitable monocyclic aralkyl substituents are benzyl, $\alpha$-phenethyl, phenylpropyl and phenylbutyl.

The compounds of this invention may be prepared by alkylating the corresponding 2-acylamino-5-benzylmercapto-1,3,4-thiadiazole with an alkyl halide under suitable reaction conditions. It is preferred to carry out the reaction in the presence of a sodium alkoxide such as sodium methoxide, sodium ethoxide or sodium propoxide.

The nature of the alkylating agent selected is critical inasmuch as it determines the kind of substituents which will enter into the 4-position of the thiadiazoline nucleus. The lower alkyl and monocyclic aralkyl halides are suitable under our reaction conditions, the bromide and iodide being preferred. As specific examples of suitable agents may be given methyl iodide, ethyl iodide, propyl iodide, butyl iodide and benzylbromide. In addition, we have found that dimethyl sulfate may be employed as an alkylating agent. Under these alkylating conditions, a methyl group is substituted in the 4-position of the thiadiazoline nucleus.

The temperature of the mixture during reaction may be varied from room temperature up to reflux, the latter being preferred. The time required for the reaction to reach completion varies widely, depending upon the nature of the substituent groups, the limits being from about 1 hour to about 24 hours. After the reaction has reached completion, the crude product may be separated either by evaporating the particular alcohol formed during the course of the reaction or by extracting with a suitable organic solvent such as ethyl acetate.

The following examples are illustrative of the present invention, but not limitative upon the scope thereof. It is not intended that the breadth of this application be confined to the particular compounds exemplified by actual working examples. All parts are by weight except where otherwise indicated.

Example I

A quantity of 26.7 parts by weight of 5-acetylamino-2-benzylmercapto-1,3,4-thiadiazole was added to a solution of 2.3 parts by weight of sodium in 200 parts by volume of warm methanol. The resulting solution was refluxed for 15 hours with 15 parts by weight of methyl iodide. After the reaction was completed, the ethanol was removed under reduced pressure, the residue being diluted with 200 parts by volume of cold water. After a short time, the oily residue solidified and was filtered off. The crude 5-acetylimino-4-methyl-2-benzylmercapto-$\Delta^2$-1,3,4-thiadiazoline was crystallized from methanol, giving a pure white product.

Example II

A 5.31 parts by weight quantity of 5-acetylamino-2-benzylmercapto-1,3,4-thiadiazole was dissolved in a warm solution of 0.46 part by weight of sodium in 40 parts by volume of absolute alcohol. A 3.42 parts by weight quantity of benzyl bromide was added, the resulting solution refluxed for two hours and the hot mixture poured into 400 parts by volume of ice water. The mixture was extracted with ethyl acetate which was washed with two 75 parts by volume quantities of 1 N sodium hydroxide and two 100 parts by volume quantities of water, dried over sodium sulfate and crystallized to a partially solid material which was soft at room temperature. Recrystallization from alcohol-water yielded pure white 5-acetylimino-4-benzyl-2-benzylmercapto-$\Delta^2$-1,3,4-thiadiazoline.

Example III

A 26.7 parts by weight quantity of 5-acetylamino-2-benzylmercapto-1,3,4-thiadiazole was dissolved in a warm solution of 2.3 parts by weight of sodium in 300 parts by volume of absolute alcohol. A quantity of 15.6 parts by weight of ethyl iodide was added and the solution was refluxed for 18 hours. The ethanol was removed under reduced pressure and the residue poured into ice water, causing the crude product to solidify. Recrystallization of the crude product from methanol yielded pure crystalline 5-acetylimino-4-ethyl-2-benzylmercapto-$\Delta^2$-1,3,4-thiadiazoline.

Example IV

A quantity of 6.7 parts by weight of 5-acetylamino-2-benzylmercapto-1,3,4-thiadiazole was added to 2.3 parts by weight of sodium in 250 parts by weight of warm ethanol. The resulting solution was refluxed for 19 hours with 12.6 parts by weight of dimethyl sulfate. After the reaction was completed, a quantity of water was added to the reaction mixture, resulting in the formation of a solid which was washed with water and then crystallized from methanol. This crude product was recrystallized from methanol, yielding pure 5-acetylimino-4-methyl-2-benzylmercapto-Δ²-1,3,4-thiadiazoline.

*Example V*

A quantity of 28.1 parts by weight of 5-propionylamino-2-benzylmercapto-1,3,4-thiadiazole was added to a solution of 2.3 parts by weight of sodium in 200 parts by volume of warm methanol. The resulting solution was refluxed for 15 hours with 15 parts by weight of methyl iodide. After completion of the reaction, the ethanol was removed under reduced pressure, the residue being reduced with 200 parts by volume of cold water. After solidification, the oily residue was filtered off. The crude 5-propionylimino-4-methyl-2-benzylmercapto-Δ²-1,3,4-thiadiazoline was crystallized from methanol, giving a pure, white product.

*Example VI*

A quantity of 28.1 parts by weight of 5-propionylamino-2-benzylmercapto-1,3,4-thiadiazole was added to a solution of 2.3 parts by weight of sodium in 200 parts by volume of warm methanol. The resulting solution was refluxed for 15 hours with 16 parts by weight of ethyl iodide. After completion of the reaction, the ethanol was removed under reduced pressure, the residue being reduced with 200 parts by volume of cold water. After solidification, the oily residue was filtered off. The crude 5-propionylimino-4-ethyl-2-benzylmercapto-Δ²-1,3,4-thiadiazoline was crystallized from methanol giving a pure, white product.

The following compounds may be prepared by following the procedure described in Example I, employing as a starting material the appropriate 5-acylamino-2-benzylmercapto-1,3,4-thiadiazole:

5 - formylimino - 4 - methyl-2-benzylmercapto-Δ²-1,3,4-thiadiazoline

5 - butyrylimino - 4 - methyl-2-benzylmercapto-Δ²-1,3,4-thiadiazoline

5 - butyrylimino - 4 - benzyl - 2-benzylmercapto-Δ²-1,3,4-thiadiazoline

5 - acetylimino - 4 - p-nitrobenzyl-2-benzylmercapto-Δ²-1,3,4-thiadiazoline

5 - acetylimino-4-butyl-2-benzylmercapto-Δ²-1,3,4 - thiadiazoline

5 - propionylimino - 4 - butyl-2-benzylmercapto-Δ²-1,3,4-thiadiazoline

5 - isobutyrylimino - 4-methyl-2-benzylmercapto-Δ²-1,3,4-thiadiazoline

5 - propionylimino - 4-propyl-2-benzylmercapto-Δ²-1,3,4-thiadiazoline

We claim:

1. A compound selected from the group consisting of those having the general formula:

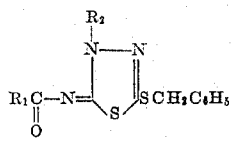

wherein $R_1$ is a member selected from the group consisting of hydrogen atoms, lower alkyl and phenyl-lower-alkyl radicals and $R_2$ is a member selected from the group consisting of lower alkyl and phenyl-lower-alkyl radicals.

2. The compound 5-acetylimino-4-methyl-2-benzylmercapto-Δ²-1,3,4-thiadiazoline.

3. The compound 5-acetylimino-4-benzyl-2-benzylmercapto-Δ²-1,3,4-thiadiazoline.

4. The compound 5-acetylimino-4-ethyl-2-benzylmercapto-Δ²-1,3,4-thiadiazoline.

5. The compound 5-propionylimino-4-methyl-2-benzylmercapto-Δ²-1,3,4-thiadiazoline.

6. The compound 5-propionylimino-4-ethyl-2-benzylmercapto-Δ²-1,3,4-thiadiazoline.

7. A method for preparing compounds selected from the group consisting of those having the general formula:

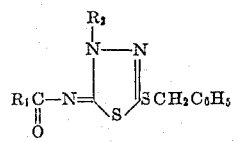

wherein $R_1$ is a member selected from the group consisting of hydrogen atoms, lower alkyl and phenyl-lower-alkyl radicals, and $R_2$ is a member selected from the group consisting of lower alkyl and phenyl-lower-alkyl radicals, which comprises treating the corresponding 5-acylamino-2-benzylmercapto-1,3,4-thiadiazole with a compound selected from the group consisting of lower alkyl halides, phenyl-lower-alkyl halides, and di-lower alkyl-sulfates in the presence of a sodium alkoxide under reflux conditions.

8. A method as set forth in claim 7, wherein the compound is methyl iodide.

9. A method as set forth in claim 7, wherein the compound is benzyl bromide.

10. A method as set forth in claim 7, wherein the compound is dimethyl sulfate.

11. A method for preparing 5-acetylimino-4-methyl-2-benzylmercapto-Δ²-1,3,4-thiadiazoline which comprises treating 5-acetylamino-2-benzylmercapto-1,3,4-thiadiazole with a methylating agent in the presence of a sodium alkoxide under reflux conditions.

12. A method for preparing 5-acetylimino-4-benzyl-2-benzylmercapto-Δ²-1,3,4-thiadiazoline which comprises treating 5-acetylamino-2-benzylmercapto-1,3,4-thiadiazole with benzyl bromide in the presence of a sodium alkoxide under reflux conditions.

13. A method for preparing 5-acetylimino-4-ethyl-2-benzylmercapto - Δ² - 1,3,4-thiadiazoline which comprises treating 5-acetylamino-2-benzylmercapto-1,3,4-thiadiazole with an ethylating agent in the presence of a sodium alkoxide under reflux conditions.

14. A method for preparing 5-propionylimino-4-methyl-2-benzylmercapto-Δ²-1,3,4-thiadiazoline which comprises treating 5-propionylamino-2-benzylmercapto-1,3,4-thiadiazole with methyl iodide in the presence of a sodium alkoxide under reflux conditions.

15. A method for preparing 5-propionylimino-4-ethyl-2-benzylmercapto-Δ²-1,3,4-thiadiazoline which comprises treating 5-propionylamino-2-benzylmercapto-1,3,4-thiadiazole with ethyl iodide in the presence of a sodium alkoxide under reflux conditions.

References Cited in the file of this patent

Bambas: Chem. of Heterocyclic Compounds, pp. 148–152 (1952), Interscience Publishers, Inc., N. Y.